United States Patent [19]

Claussen et al.

[11] Patent Number: 5,602,596

[45] Date of Patent: Feb. 11, 1997

[54] METHOD FOR NAVIGATING A COMPLEX MULTIMEDIA STRUCTURE AT AN INTERACTIVE USER STATION

[75] Inventors: Cameron Claussen, Denver; David Crayton, Littleton; George Engelbeck, Boulder; Don Hubbard, Nederland; Larry Toby, Aurora, all of Colo.

[73] Assignee: U S West Technologies, Inc., Boulder, Colo.

[21] Appl. No.: 225,124

[22] Filed: Apr. 8, 1994

[51] Int. Cl.$^6$ ............................. H04N 5/445; H04N 9/74
[52] U.S. Cl. .................. 348/564; 348/588; 345/146; 345/118; 395/352; 395/356
[58] Field of Search .................. 348/150, 563, 348/564, 565, 566, 567, 734, 588, 589, 13; 395/155–161; 345/146, 117–120

[56] References Cited

U.S. PATENT DOCUMENTS

| | | | |
|---|---|---|---|
| 4,712,191 | 12/1987 | Penna | 395/156 X |
| 4,914,516 | 4/1990 | Duffield | 348/565 |
| 5,142,662 | 8/1992 | Gump et al. | 395/100 |
| 5,161,012 | 11/1992 | Choi | 348/564 |
| 5,181,273 | 1/1993 | Ohtani | 395/155 X |
| 5,194,954 | 3/1993 | Duffield | 348/732 |
| 5,198,802 | 3/1993 | Bertram et al. | 345/146 |
| 5,235,509 | 8/1993 | Mueller et al. | 395/156 X |
| 5,297,253 | 3/1994 | Meisel | 395/160 |
| 5,353,401 | 10/1994 | Iizawa et al. | 395/155 X |
| 5,398,074 | 3/1995 | Duffield et al. | 348/564 |

OTHER PUBLICATIONS

IBM Technical Disclosure Bulletin, vol. 34, No. 11, April 1992, Armonk, NY, U.S. p. 29 'Multimedia Menus' (the whole document).

Primary Examiner—Victor R. Kostak
Assistant Examiner—John W. Miller
Attorney, Agent, or Firm—Brooks & Kushman

[57] ABSTRACT

A method is disclosed for navigating a complex structure at an interactive user station. The complex structure includes a plurality of nodes and each node includes at least one presentation element. The interactive user station includes a processor, a memory, and a presentation device. The presentation device comprises a plurality of presentation cells arrangeable in an array. The method includes the step of presenting at least one presentation element associated with a first node at the presentation cells. The method further includes the step of receiving at the processor a signal indicating a user selection of a presentation cell. In addition, the method includes the step of identifying a second node based on the selected presentation cell. The method finally includes the step of presenting at least one presentation element associated with the second node at the presentation device.

12 Claims, 8 Drawing Sheets

METHOD FOR NAVIGATING A COMPLEX MULTIMEDIA STRUCTURE AT AN INTERACTIVE USER STATION

TECHNICAL FIELD

This invention relates generally to methods for processing and presenting information. In particular, this invention relates to methods for navigating a complex structure of audio/video elements at an interactive user station.

BACKGROUND ART

Businesses providing products or services have traditionally found it useful to advertise. In order for advertising to be effective, an advertisement must contain information such as available products or services, prices and vendor locations. Further, this information must be conveyed to interested potential customers.

In the past, promotion of products or services has been accomplished using techniques including catalog sales, vendor directories, telemarketing, direct mail and radio, television and newspaper advertising. These techniques have certain disadvantages in both cost and effectiveness.

Recently, computerized promotion has been added to the list of advertising techniques. A system providing computerized promotion may be placed in a common area of a shopping mall or hotel lobby to provide patrons information regarding local vendors.

The typical computerized promotion system is text-based, menu driven and primarily operates as a directory to vendors. A user must select from a classification menu to identify the desired type of vendor. A user must then select from a vendor list to obtain information on the desired vendor.

While the prior art methods and systems provide promotional information to users, the prior art has significant shortcomings. A first shortcoming is that users are provided little opportunity to interact with the promotional presentation. A user must often wait until a presentation is finished to make a new selection. In instances where the method supports user interruption of a presentation, the user must navigate through a text-based menu system to select a new presentation.

A second shortcoming is that the selection mechanisms and user interfaces are not intuitive. Users must understand the concepts of hierarchical menu systems to best utilize the prior art computerized promotional methods and systems.

Another shortcoming is that the prior art menu driven promotional methods and systems require a user to spend a large percentage of time operating the system when compared to the time spent viewing the promotional material.

Yet another shortcoming is that a limited amount of information is presented to the user at one time. Other art areas, such as the field of television receivers having picture-in-picture capability, have addressed this problem by providing multiple display areas on a television screen.

U.S. Pat. Nos. 4,914,516 and 5,194,954 of Duffield relate to channel sampling circuits for scanning broadcasts on multiple television channels. These circuits display freeze-frames received from various television channels.

U.S. Pat. No. 5,161,012 of Choi discloses a multi-screen generating circuit capable of displaying on a main screen a plurality of multi-screens. The circuit provides the capability of selecting the type of multi-screens regardless of the number of broadcasting channels.

Although the prior art in other areas provides more information on a single screen than current advertising stations, the picture-in-picture systems described are not adapted for use in computerized advertising stations.

DISCLOSURE OF THE INVENTION

A need therefore exists for a method which addresses the shortcomings of the prior art computerized advertising stations presently known and available. In view of the prior art, there is a need to develop a method which provides a user with ample opportunity to interact with the promotional presentation.

A need further exists for a method which provides intuitive selection mechanisms and user interfaces. Another need exists for a method which minimizes the amount of time a user must spend operating the system when compared to the time spent viewing promotional material.

Yet another need exists for a method which provides maximum use of the presentation area of a display device.

The present invention described and disclosed herein comprises a method and system for navigating a complex structure at an interactive advertising station.

It is an object of the present invention to provide a method for processing and presenting information at an interactive advertising station which facilitates asset collection by preserving a 3×4 video aspect ratio.

It is another object of the present invention to provide a method for processing and presenting information at an interactive advertising station which provides multiple presentation cells to increase the amount of information presented.

It is yet another object of the present invention to provide a method for navigating a complex structure of audio/video elements at an interactive advertising station which provides a user with an intuitive user interface.

In carrying out the above objects and other objects of the present invention, a first method is provided for navigating a complex structure at an interactive user station. The complex structure comprises a plurality of nodes. Each node includes at least one presentation element. A presentation element can be a silent motion picture, a motion picture with associated audio, a still picture or any other commonly used presentation medium.

The user station includes a processor in electrical communication with a memory and a presentation device. The presentation device includes a display having presentation cells arrangeable in an array. In the preferred embodiment, the presentation device is a video wall.

The method begins with the step of presenting at the presentation device at least one presentation element associated with a first node. The method continues with the step of receiving a signal at the processor indicating a user selection of one of the presentation cells.

The method further includes the step of identifying a second node based on the selected presentation cell. The method finally includes the step of presenting at the presentation device at least one presentation element associated with the second node.

In further carrying out the above objects and other objects of the present invention, a second method is provided for navigating a complex structure at an interactive user station. The complex structure comprises a plurality of nodes, and each node includes at least one presentation element.

The method begins with the step of presenting at the presentation device at least one presentation element associated with a first node. The method continues with the step of receiving a signal at the processor indicating a user selection of one of the presentation cells. The method concludes with the step of processing at least one predefined step associated with the selected presentation cell.

The objects, features and advantages of the present invention are readily apparent from the detailed description of the best mode for carrying out the invention when taken in connection with the accompanying drawings.

BRIEF DESCRIPTION OF THE DRAWINGS

A more complete appreciation of the invention and many of the attendant advantages thereof may be readily obtained by reference to the following detailed description when considered with the accompanying drawings in which reference characters indicate corresponding parts in all of the views, wherein.

BEST MODES FOR CARRYING OUT THE INVENTION

Figure 1:
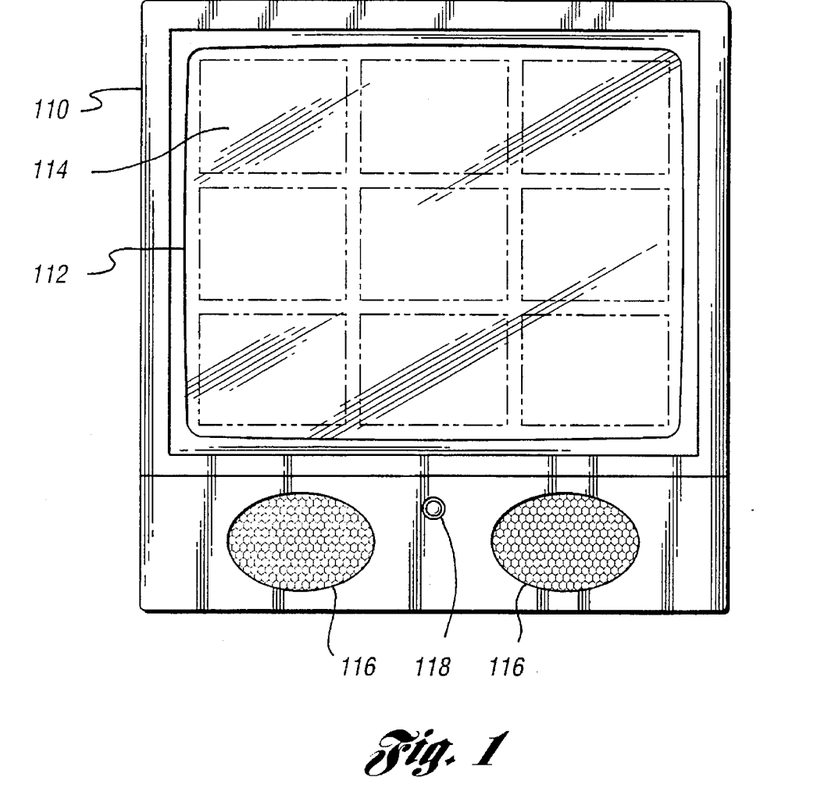
FIG. 1 is a diagram illustrating the interactive user station used in accordance with the present invention.

Referring to the drawings, FIG. 1 illustrates an interactive user station for implementing the methods of the present invention. The user station 110 includes a display area 112 having nine presentation cells 114 for presenting video information.

In the preferred embodiment, the display area is a screen of a single video monitor. The screen is sub-divided into nine presentation cells 114. In alternative embodiments, the display area could be a video wall, projector, or any other device adapted for displaying information. The video information displayed at a presentation cell 114 may be a complete video image or may be a portion of a complete video image displayed using a matrix of presentation cells 114.

Preferably, the user station 110 includes speakers 116 for presenting audio information. The audio information can be used to accompany or supplement the video information presented at the display area 112.

In addition, the user station 110 preferably includes a pointing device or an interface to a pointing device. The user station 110 of FIG. 1 includes an infrared receiver 118. The infrared receiver 118 receives signals from an associated transmitter. The infrared receiver forms part of a hardware user interface and is connected to a processor within the user station 110 for communicating user commands to the processor.

Figure 2A:
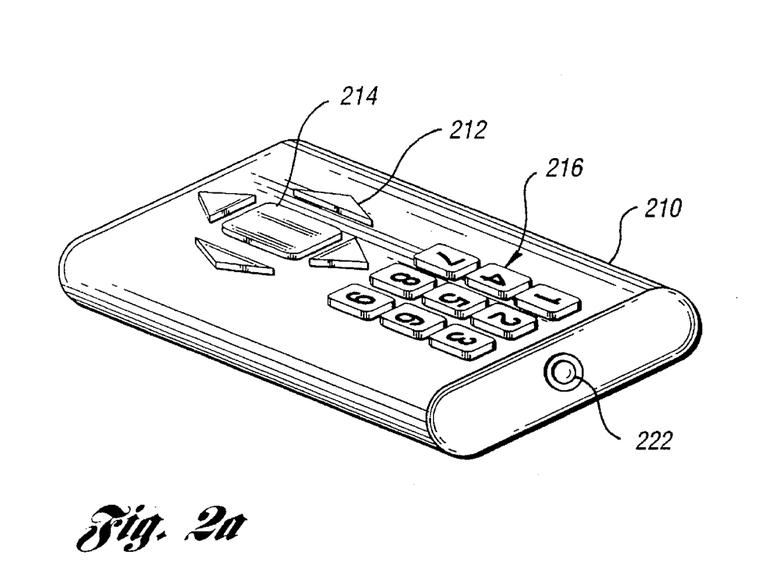
FIG. 2a is a diagram illustrating the preferred pointing device used in accordance with the present invention.

Referring now to FIG. 2a, there is illustrated a remote control device 210 for use with the user station 110. The remote control device 210 includes fourteen buttons for communicating with user station 110.

Four directional buttons 212 are provided to permit the user to indicate movement of a pointer at the display area 112. The pointer can take any form including an arrow, a cursor, and a highlighted border around the presentation cell 114. Preferably, the pointer is a selection cursor positionable within any of the nine presentation cells.

The remote control device 210 also includes a set of nine buttons for positioning the selection cursor. Each of the nine buttons can be associated with a presentation cell. The buttons are preferably numbered 1–9 and are arranged in a fashion similar to the buttons of a standard touch-tone telephone.

Pressing one of the nine buttons causes the selection cursor to be positioned within the associated presentation cell. Pressing "1", for example, causes the selection cursor to be positioned in the upper left presentation cell, while pressing "5" causes the selection cursor to be positioned in the center presentation cell.

The remote control device 210 also includes a SELECT button 214. The SELECT button 214 allows the user to indicate a selection of the presentation cell 114 identified by the pointer such as a highlighted border. Pressing the SELECT button 214 instructs the processor to execute steps associated with the selected presentation cell. Typically, these steps will identify and present a second node associated with the selection presentation cell 114. This often provides the user with more information regarding the item displayed in the selected presentation cell 114.

Additionally, the remote control device 210 includes an infrared transmitter 222 for transmitting signals representing user commands to the associated infrared receiver 118.

Figure 2B:
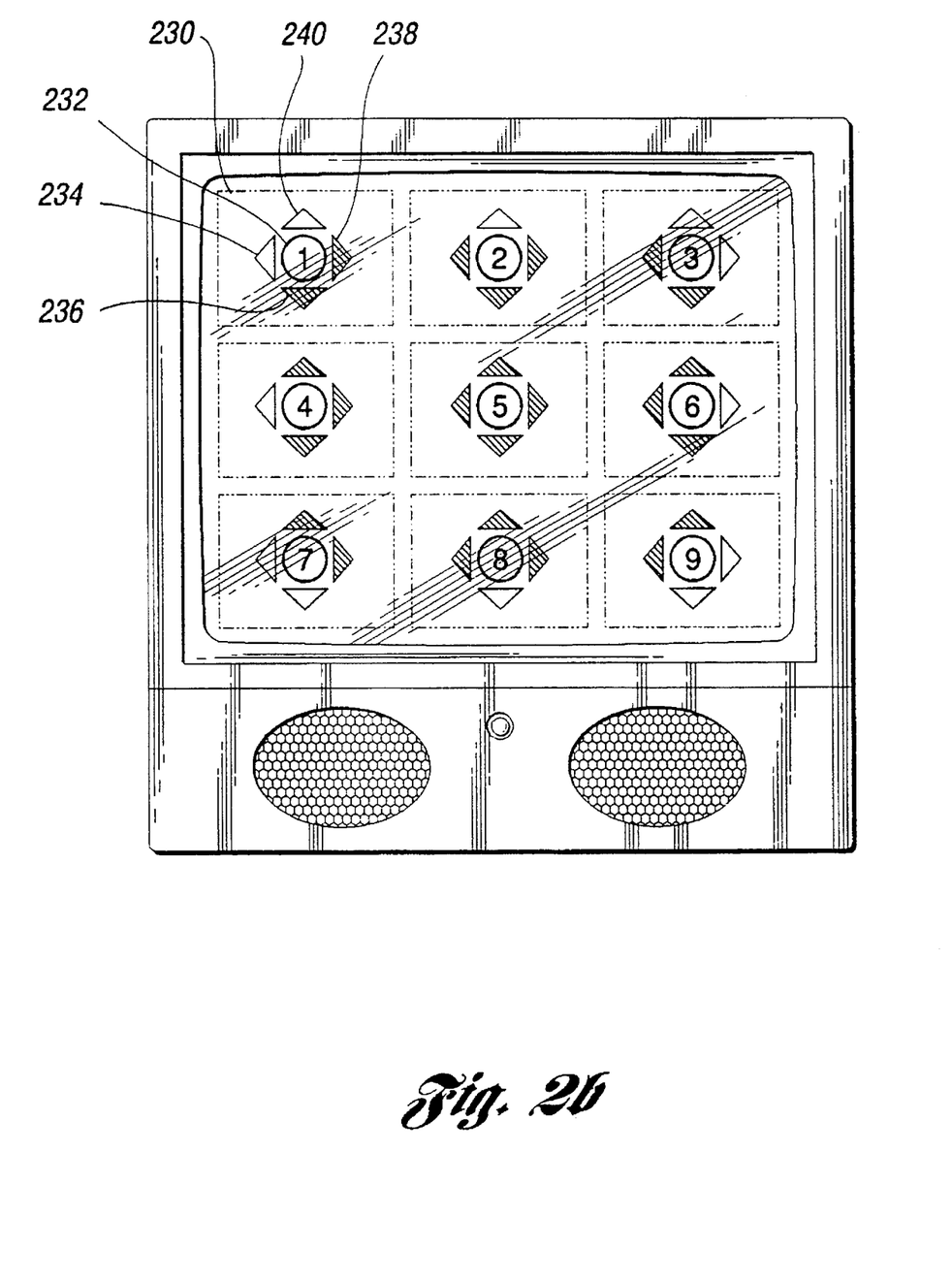
FIG. 2b is a diagram illustrating the preferred cursor of the present invention.

Referring now to FIG. 2b, there is illustrated a functional schematic of the display screen showing the nine possible cursor displays of the preferred embodiment. The cursor, generally referred to by reference numeral 230, is a graphical representation of the directional buttons 212 and selection button 214 of remote control device 210. Each representation of cursor 230 includes a presentation cell number 232 and four arrow indicators 234–240 to assist the user with cursor positioning.

Arrow indicators 234 and 240 representing left and up directional buttons are denoted as invalid using a first shading. Arrow indicators 236 and 238 representing down and right directional buttons are denoted as valid using a second shading. Presentation cell number 232 of cursor 230 identifies the current presentation cell as "one".

Figure 3:
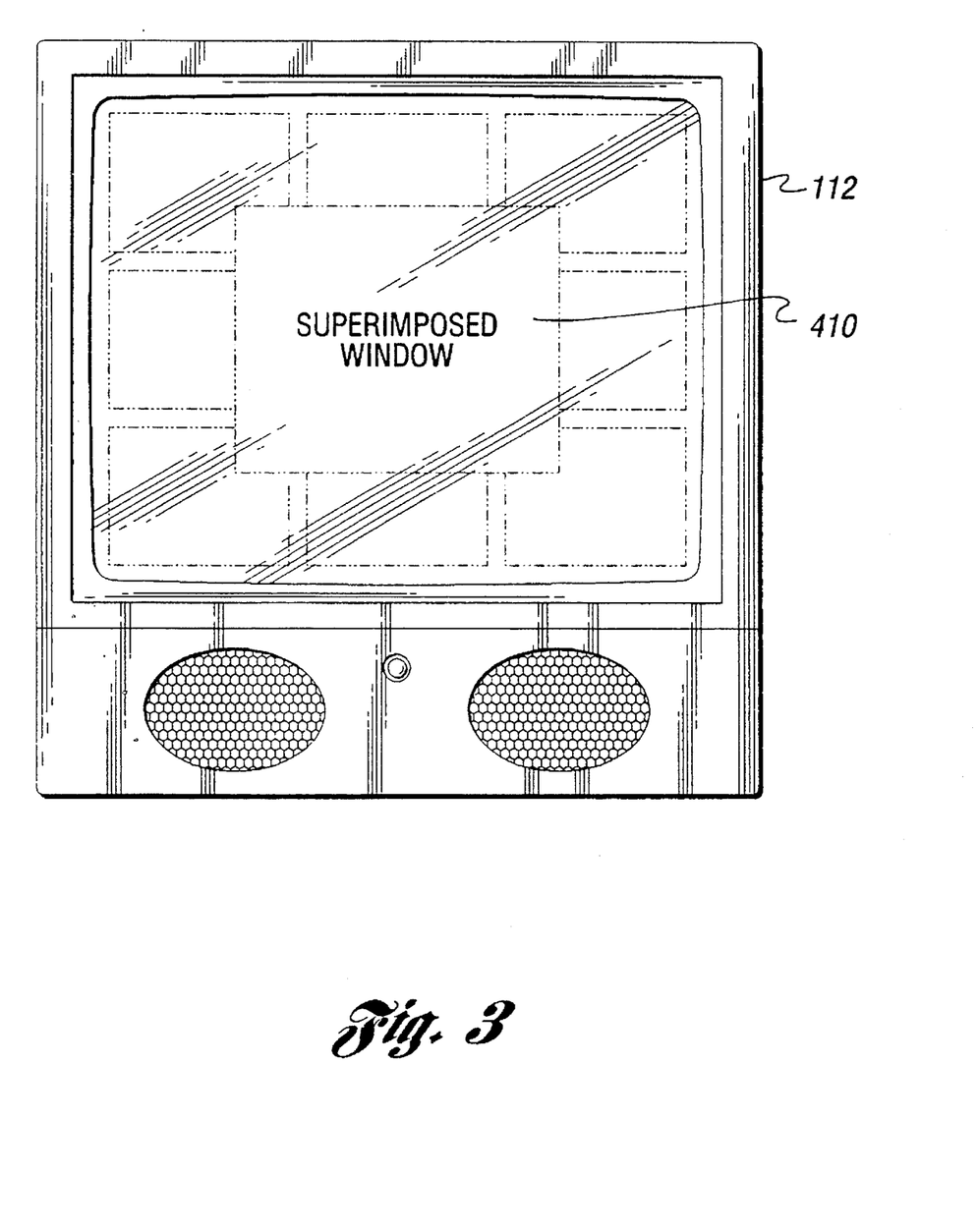
FIG. 3 is a functional block diagram illustrating a superimposed window used by the present invention.

Referring now to FIG. 3, there is illustrated a functional schematic of the display screen showing a superimposed text window over the matrix of cells. The superimposed window 410 is used to communicate textual information to the user. Typically, this textual information represents a menu of options selectable by the user.

Figure 4:
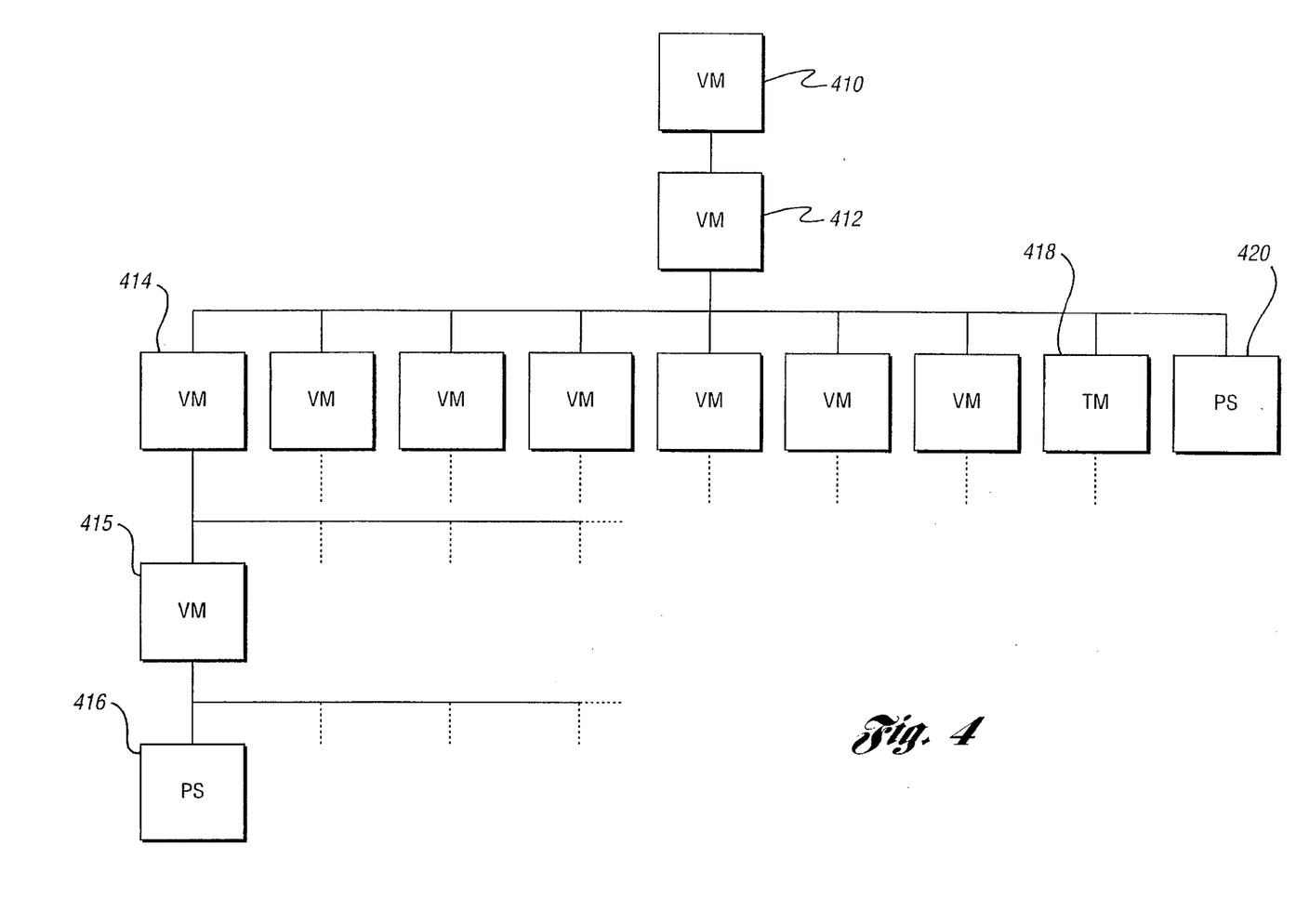
FIG. 4 is a block diagram representing a hierarchial structure of audio/visual elements.

Referring now to FIG. 4, there is illustrated a schematic diagram representing a hierarchical structure of nodes in accordance with the present invention. For simplicity, the illustrated structure describes the relationship between nodes in an interactive user application for use in a department store. Each node includes at least one audio/visual element related to the products or services in the department store.

The present invention could easily be used in conjunction with an entire shopping mall or chain of department stores. It is further envisioned that the audio/visual elements are not limited to products and services. Audio/visual elements may relate to a number of topics such as scheduled activities within the mall, concert information, or interactive guided tours of the mall.

In the preferred embodiment, a structure would include seller modules, visual menu segments and product segments. Seller modules are grouped segments pertaining to a specific seller, such as a department store. Visual menu segments organize the presentation and provide navigation through the structure. Visual menus define the parent-child relationships. For each mode, product segments permit users to perform functions based on the displayed product. Typical functions include displaying features of the product, displaying product information, displaying instructional information and logging a sale of the product.

In the preferred embodiment, each audio/visual element of a node is displayed in at least one presentation cell. Each presentation cell has associated behavior which is performed when the cell is selected by the user. This behavior association is conceptually similar to a hypercard stack design, wherein each cell represents a button a user may press.

The behavior associated with a cell could be navigational or functional. For example, selecting a cell having a navigational behavior could result in the presentation of an associated next node. Selecting a cell having functional behavior might result in a live sales agent appearing on the display to assist a shopper or in a supper imposed menu appearing on the display.

Visual menu 410 is the root node of the structure shown in FIG. 4. Node 410 is an introductory node. The purpose of root node 410 is to introduce the shopper using the present invention to the department store. The user may begin navigating the structure by selecting any presentation cell displaying a presentation an element of root node 410. The interactive user station will then display the presentation element associated with node 412 which is a visual menu.

Visual menu 412 is a menu of departments which includes nine presentation elements. Each presentation element corresponds to an individual presentation cell. Seven of the presentation elements associated with node 412 relate to departments within the department store. The eighth presentation element of node 412 provides the user access to a store directory. The ninth presentation element of node 412 is a product segment which provides information regarding a special promotion.

To navigate through the structure, the user may select one of the nine presentation cells from visual menu 412. Upon the user's selection of a department related presentation cell, the interactive user station will display the presentation elements of node 414. Node 414 is a visual menu which includes presentation elements related to products carried in the selected department.

Node 414 is a first display of a multi-display visual menu of products. Visual menu 414 could, for example, include presentation elements relating to apparel available in a men's clothing department of a department store. Upon selecting a presentation cell of node 414, the interactive user station will navigate the user to the selected node. Node 415 is a second display of a multi-display visual menu.

After navigating through the structure, the user will often find desired information in a product segment. This is illustrated by node 416.

Figure 5:
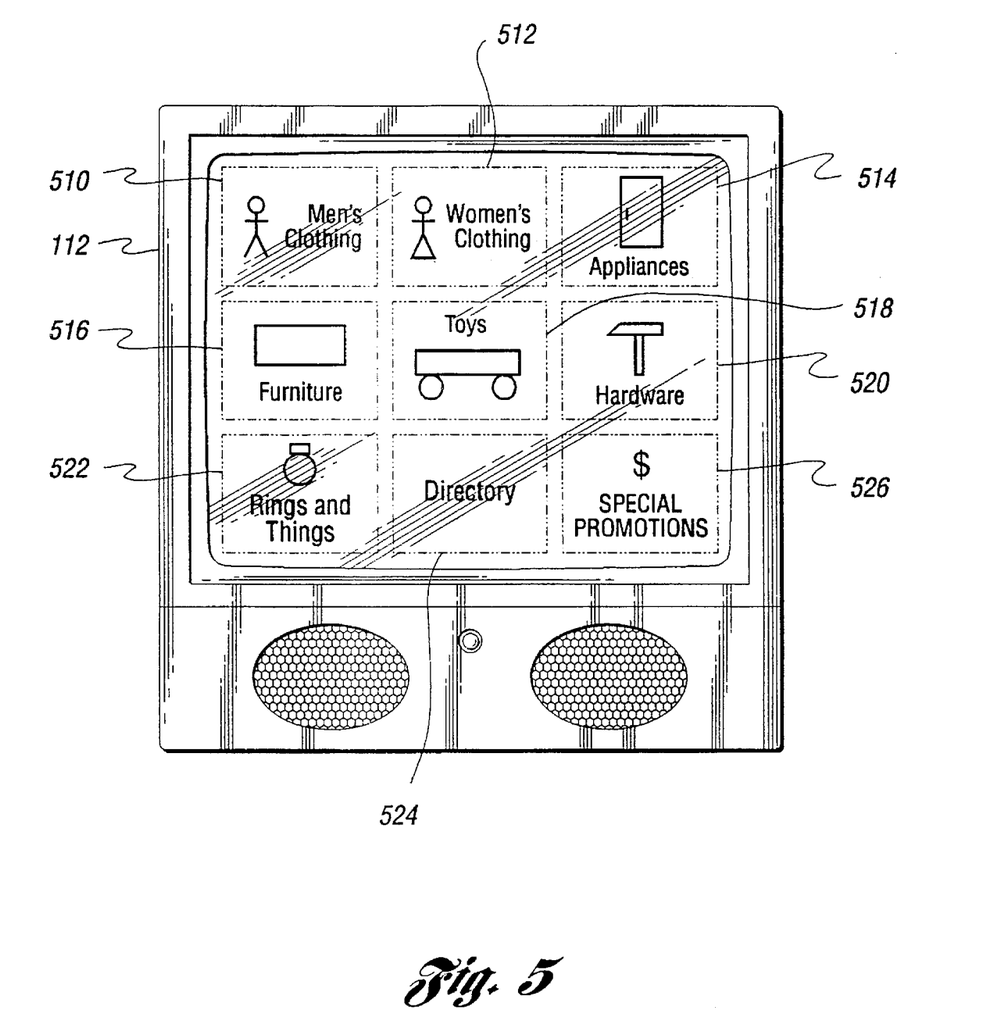
FIG. 5 is a diagram illustrating a visual menu.

FIG. 5 illustrates the contents of visual menu 412. Visual menu 412 includes presentation elements pertaining to departments within the department store including men's clothing 510, women's clothing 512, appliances 514, furniture 516, toys 518, hardware 520, and jewelry 522. Visual menu 414 further includes presentation element 524 associated with a special promotion product segment and presentation element 526 associated with a store directory text menu.

Selecting presentation cells in which presentation elements 510–522 are displayed provides the user the ability to navigate the complex structure. Selecting the presentation cell displaying presentation element 524 causes product segment 420 to be displayed. Selecting the presentation cell displaying presentation element 526 causes a text menu 418 to appear in a superimposed window 410. Menu 418 permits the user to additional information or perform functions by selecting text menu options.

Figure 6A:
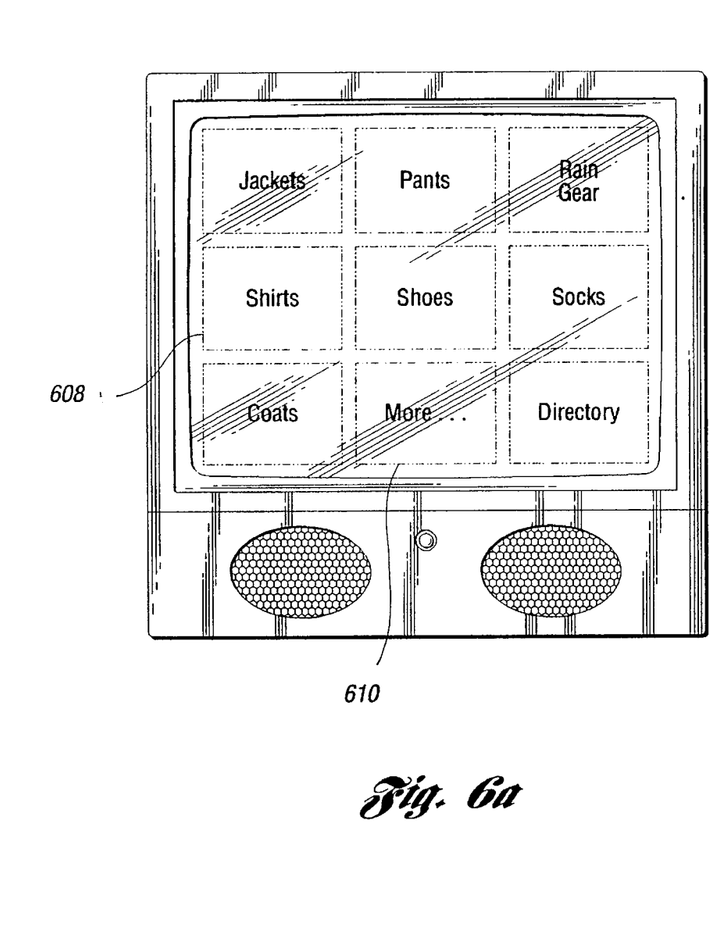
FIGS. 6a and 6b are diagrams of first and second displays of a multi-display visual menu.

FIG. 6A illustrates node 414, a first display of a typical multi-display visual menu including variety of presentation elements. A first set of presentation elements is shown generally at 608.

Figure 6B:
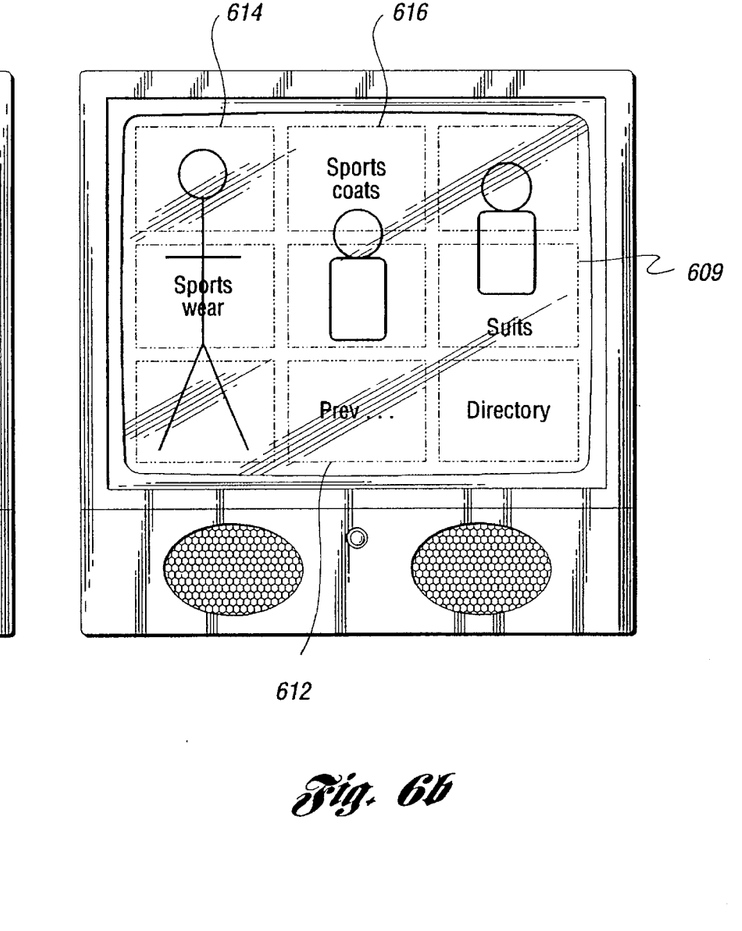

FIG. 6B illustrates node 415, a second display of a typical multi-display visual menu. A second set of presentation elements is shown generally at 609. Particular attention is directed to presentation elements "more . . . " 610, "prev . . . " 612, "sportswear" 614 and "sport coats" 616.

Selection of the presentation cell associated with presentation element 610 causes the second set of presentation elements 609 to be displayed at the display area 112. Similarly, selection of the presentation cell associated with presentation element 612 causes the first set of presentation elements 608 to be displayed at the display area 112.

Presentation elements 614 and 616 illustrate the use of multiple presentation cells to display a single presentation element. Presentation element 614 provides the user with information regarding sportswear and is displayed in a 1×3 matrix of presentation cells. Presentation element 616 provides information regarding sport coats and is displayed in a 1×2 matrix of presentation cells.

Figure 7:
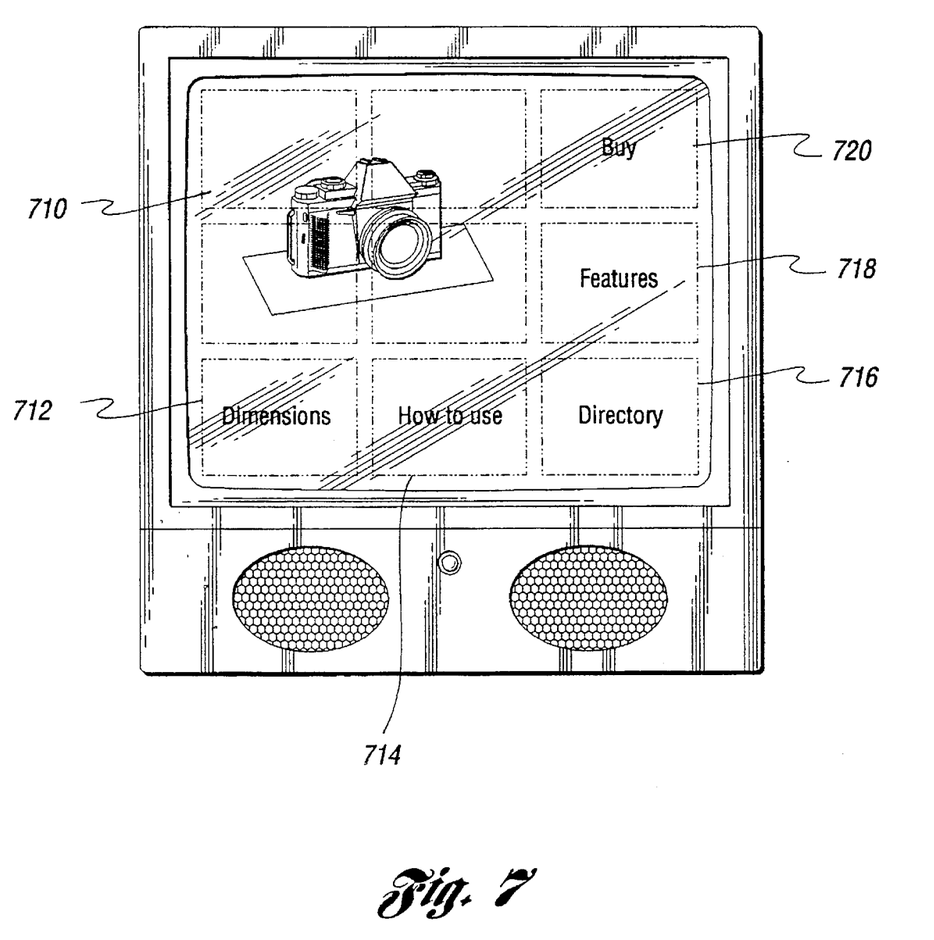
FIG. 7 is a diagram illustrating a product segment.

Referring now to FIG. 7, there is illustrated a typical product segment such as node 416 or node 420 used in accordance with the present invention. The illustrated product segment includes a presentation element 710 displayed in a 2×2 matrix of presentation cells. Presentation element 710 could be a digitized photograph, motion picture or other medium providing information allowing the user to identify and examine the associated product.

Presentation element 712 provides the user the ability to request information regarding product dimensions. Upon detecting a selection of the cell displaying presentation element 712, the interactive user station performs a set of pre-defined steps. For example, presentation element 712 might be enlarged and displayed using the entire display area 112.

Presentation element 714 provides the user information regarding product use. Upon detecting a selection of the cell displaying presentation element 714, the interactive user station performs a set of pre-defined steps associated with presentation element 714. These steps, for example, might cause a superimposed text menu to appear allowing the user to indicate a specific usage he or she would like demonstrated.

Presentation element 716 provides the user the ability to view a directory of departments and products. Presentation element 716 further provides the user an alternative structure navigation technique. Upon detecting a selection of the cell displaying presentation element 716, the interactive user station performs a set of pre-defined steps to facilitate this functionality.

Presentation element 718 provides the user information regarding product features. Upon detecting a selection of the cell displaying presentation element 718, the interactive user station performs a set of pre-defined steps associated with the presentation element 718. In the preferred embodiment, these steps would cause the interactive user station to display a motion picture sequence specifically directed to features of the product. This motion picture sequence is displayed using the entire display area 112.

Presentation element 720 provides the user the ability to purchase the displayed product. Upon detecting a selection of the cell displaying presentation element 720, the interactive user station performs a set of pre-defined steps associated with the presentation element 720. These steps, for example, might cause video information representing a live sales agent to be displayed in the presentation cell associated with presentation element 720. An alternative embodiment might include displaying a text-based purchase form displayed in a superimposed window to permit the user to authorize a product purchase.

Figure 8:
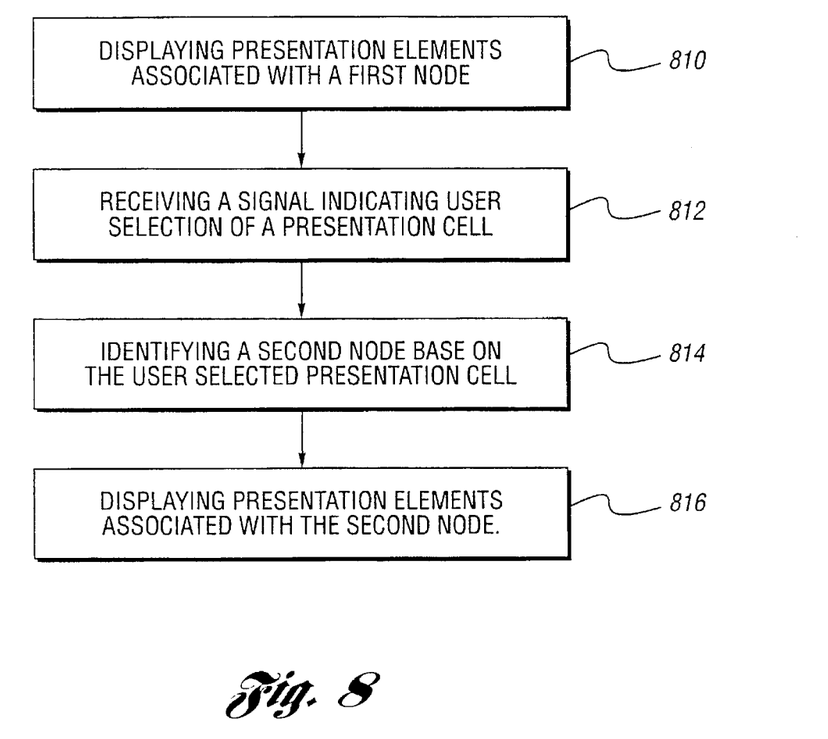
FIG. 8 is a flow chart illustrating a first method of operating the interactive user station in accordance with the present invention.

Referring now to FIG. 8, there is illustrated a flow chart describing a first method of operating the interactive user station in accordance with the present invention. As shown by block 810, the method begins with the step of displaying presentation elements associated with a first node. In the preferred embodiment, the first node is a visual menu.

The method continues with the step of receiving a signal indicating a user selection of a presentation cell as shown in block 812. Preferably, the step of receiving includes the steps of positioning an indicator at the presentation device to identify a presentation cell and receiving a command at the processor of the interactive user station. The user typically initiates the signal using a pointing device or a touch sensitive display screen.

The next step of the method, as shown in block 814, is the step of identifying a second mode based on the user selected presentation cell. This step is implemented using control logic stored in a memory at the interactive user station.

Finally, block 816 illustrates the step of displaying presentation elements associated with the second node. This step provides the user the ability to navigate through the complex structure.

Figure 9:
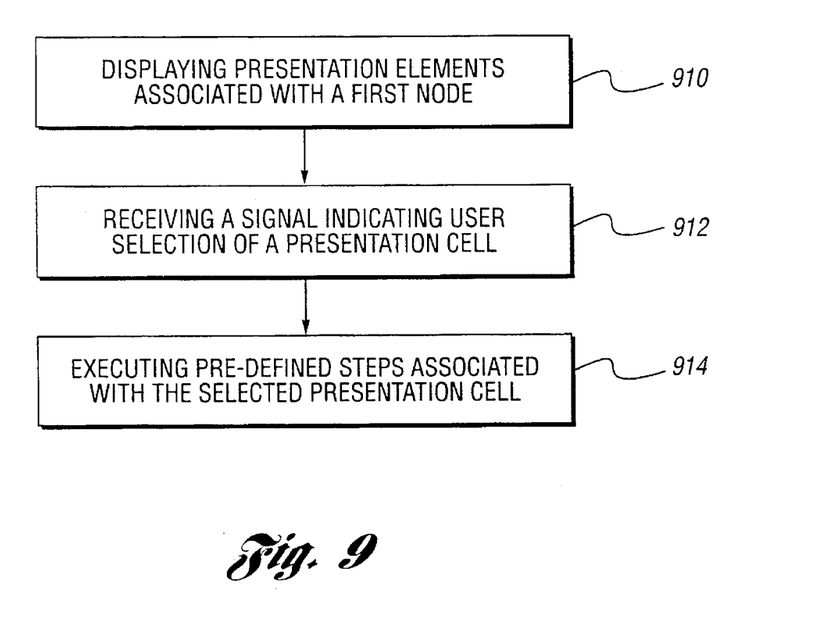
FIG. 9 is a flow chart illustrating a second method of operating the interactive user station in accordance with the present invention.

Referring now to FIG. 9, there is illustrated a flow chart depicting a second method of operating the interactive user station in accordance with the present invention. As shown by block 910, the method begins with the step of displaying presentation elements associated with a first node. In the preferred embodiment, the first node is a visual menu.

The method continues with the step of receiving a signal indicating a user selection of a presentation cell as shown in block 912. Preferably, the step of receiving includes the steps of positioning an indicator at the presentation device to identify a presentation cell and receiving a command at the processor of the interactive user station. The user typically initiates the signal using a pointing device or a touch sensitive display screen.

Finally, as shown in block 914, the step of executing predefined steps associated with the selected presentation cells is performed. This step is accomplished using control logic stored in a memory at the interactive user station. The predefined steps typically accomplish functions such as displaying a text menu in a superimposed window, redirecting the display of a presentation element associated with the first node or changing the display of a presentation cell.

While the best mode for carrying out the invention has been described in detail, those familiar with the art to which this invention relates will recognize various alternative designs and embodiments for practicing the invention as defined by the following claims.

What is claimed is:

1. A method for navigating a complex multimedia structure for providing product/service information at an interactive user station, the complex structure comprising a plurality of nodes, each node including at least one presentation element, the interactive user station including a processor in electrical communication with a memory and a presentation device, the presentation device including a display area having a plurality of presentation cells arrangeable in an array, the method comprising:

(a) presenting the at least one presentation element associated with a first node via at least one of the plurality of presentation cells in the array;

(b) receiving at the processor a signal indicating a user selection of one of the presentation cells;

(c) identifying a second node based on the selected presentation cell; and (d) presenting the at least one presentation element associated with the second node via at least two of the plurality of presentation cells in the array, the at least one presentation element including motion picture and audio portions relating to product/service feature and sales information.

2. The method of claim 1 wherein the at least one presentation element further includes a still image.

3. The method of claim 1 wherein step (b) further includes the steps of:

positioning an indicator at the presentation device to identify a presentation cell; and receiving a command at the processor.

4. The method of claim 1 wherein the complex structure is a hierarchical tree structure.

5. The method of claim 1 wherein the display screen is a touch sensitive display screen and step (b) includes the step of receiving a signal at the processor from the touch sensitive display screen.

6. The method of claim 1 wherein the presentation cells are arranged in a matrix of rows and columns.

7. The method of claim 6 wherein the matrix is a 2 by 2 matrix.

8. The method of claim 6 wherein the matrix is a 3 by 3 matrix.

9. The method of claim 1 wherein the at least one presentation element of the second node is presented in a window superimposed over the presentation cells.

10. The method of claim 1 wherein the first node is a root node of the complex structure.

11. The method of claim 1 wherein the first node is an intermediate node of the complex structure.

12. The method of claim 1 wherein the second node is a leaf node of the complex structure.

* * * * *